Jan. 20, 1959 D. D. DUESENBERG Re. 24,593

VALVE STEM SEAL

Original Filed Feb. 27, 1958

INVENTOR

D.D. DUESENBERG

BY E.C. McRae
J.R. Faulkner
T.W. Oster
ATTORNEYS

United States Patent Office

Re. 24,593
Reissued Jan. 20, 1959

24,593

VALVE STEM SEAL

Denny D. Duesenberg, Dearborn, Mich., assignor to Ford Motor Company, Dearborn, Mich., a corporation of Delaware Original No. 2,843,102, dated July 15, 1958, Serial No. 718,067, February 27, 1958. Application for reissue August 21, 1958, Serial No. 756,497

14 Claims. (Cl. 123—188)

Matter enclosed in heavy brackets [ ] appears in the original patent but forms no part of this reissue specification; matter printed in italics indicates the additions made by reissue.

This invention is concerned with the valve gear of an internal combustion engine and more specifically with a means for controlling the leakage of fuel or lubricant between the valve and the valve guide. This invention is an improvement over the valve stem seal patented by Harry G. Smith et al., and issued as United States Letters Patent 2,698,012 on December 28, 1954.

Leakage of fuel or lubricant between the valve and valve bushing can result in the dilution of the lubricant between the valve and valve bushing by the fuel or sticking of the valve in the valve bushing due to the carbonization of excess oil leaking between these two members. Attempts to solve this problem have taken the form of umbrella type metal and/or elastomer seals frictionally or rigidly secured to the valve stem which prevent direct and excessive wetting of the valve stem by the engine lubricant. In the friction type of securing, the friction between the valve stem and the valve stem seal is depended upon to hold the seal in its proper place on the stem. After prolonged use, however, the seal which is made of an elastomer becomes hard and loses some of its resiliency thereby allowing the seal to slide on the valve stem during the operation of the engine. This movement prevents effective sealing thereby resulting in the leakage of fuel or lubricant between the valve and valve bushing.

It is, therefore, an object of this invention to provide an improved valve stem seal in which the seal will be effectively retained in its proper place on the stem after the initial seal setting.

Another object of this invention is to provide a mechanical lock between the valve stem and the valve seal to insure the anchoring of the seal on the valve stem during engine operation.

Still another object of this invention is to provide an economical automatic mechanical lock between the valve seal and the stem. Other objects of this invention will become more apparent when the following preferred embodiment is considered in connection with the drawings in which.

Figure 1:
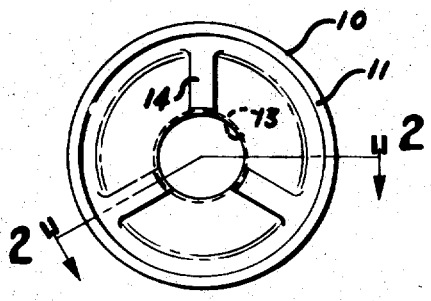
Fig. 1 is a bottom plan view of the seal.
Figure 2:
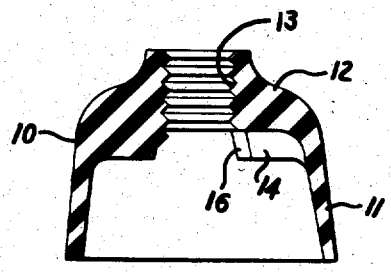
Fig. 2 is a cross section of the seal taken on the plane indicated by the line 2—2 of Figure 1.

Referring now to the drawings, a valve stem seal 10 is provided which is made from an elastomer and is provided with a dependent flared skirt 11 which is secured to a heavy annular base 12. Base 12 is provided with an axial stem opening which is smaller in diameter than the valve stem which will be thrust therethrough and which is provided with a plurality of annular grooves or serrations 13. Protuberances 14 may be provided below the annular base 12 and adjoin the dependent flared skirt 11.

The inner face 16 of the protuberance 14 is outwardly flared at an angle with the axis of the opening 13 so that the diameter is as large or larger than the valve stem over which the seal will be thrust. This provision is made in order to simplify assembly and eliminate the distortion to the skirt when the seal is assembled to the valve stem.

Figure 3:
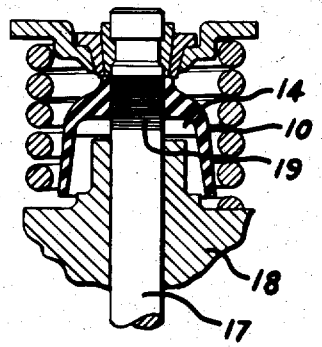
Figure 3 is a cross section of a portion of the valve gear incorporating the improved seal and stem lock; and, Figure 4 is an enlarged fragmentary view of the valve stem and valve seal and showing the mechanical lock between the two parts which comprise this invention.
Figure 4:
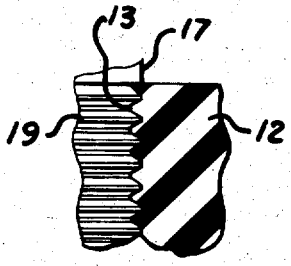

In Figure 3 the seal is shown secured in position on the valve stem which is in the fully depressed position. In this figure valve stem 17 has been thrust through the grooved opening 13 in the heavy annular base 12 and is carried in the valve guide 18. A plurality of annular grooves or serrations 19 are provided at the neck of the valve stem 17 for engagement with the grooves 13 in the seal 10. In the initial seal setting assembly, seal 10 is slipped over the stem 17 and pushed down the stem as far as possible. The first time the valve is opened, the seal 10 is forced axially along the valve stem and over the grooves 19 to a position where the protuberances 14 are in contact with the guide 18 when the valve is in the fully opened position. Because of the grooves in both the valve stem and the seal, a mechanical interengagement is accomplished as is shown in Figure 4.

Upon the aging of the elastomer seal and subsequent loss of resiliency, the mechanical locking of the seal on the stem will prevent unwanted relative axial movement of the seal on the stem.

Because of the nature of this invention, the grooves on the valve stem may be made when the stem diameter is being finish machined while the grooves in the seal may be added to the die used to make the part.

Although this invention is disclosed on a particular skirted valve stem seal, it is obvious that the invention may be used in a variety of seal designs in which the seal is made from an elastomer, plastic or elastic material.

Although the preferred embodiment of the invention is disclosed whereby grooves and serrations are used on both the seal and valve stem, it is possible to use a variety of deformations, knurls, threads, ridges and other means only on the stem. Because of the flowing character of the seal material, the seal opening surface flows about these deformations, and a mechanical lock between the seal and the stem is obtained. It will be understood, therefore, that the invention is not to be limited to the exact construction shown and described, but that various changes and modifications may be made without departing from the spirit and scope of the invention as defined in the appended claims.

What is claimed is:

1. An internal combustion engine comprising a poppet valve and an elastomer seal, an opening in said seal for accommodating the valve stem, a plurality of serrations on said stem and in said seal opening whereby the seal is secured to said stem by the interlocking engagement of the serrations of said valve seal and valve stem.

2. An internal combustion engine comprising a poppet valve and a valve stem seal, said seal being arranged to circumferentially engage said valve stem, annular grooves on said valve stem seal and said valve stem, said grooves being engageable between said valve stem seal and said valve stem upon the initial operation of the engine.

3. An internal combustion engine comprising a poppet valve and an elastomer skirted valve stem seal, said valve having a stem portion and a plurality of ridges on said valve stem, said seal having an annular base, the opening in said seal having a plurality of ridges adapted to engage the ridges on said valve stem whereby the seal is secured to the stem by the interlock of said ridges and moves in synchrony with the valve, the frictional force between the valve stem and the seal being greater than the axial force imparted to the seal by the acceleration of the valve.

4. An internal combustion engine comprising a poppet valve and a valve seal, unbendable ridges formed on said valve stem for engagement with the valve seal, cooperating deformable ridges formed in the valve seal surface engageable with the valve stem ridges, said valve seal ridges being initially deformed when the valve seal is assembled to said valve stem and subsequently attaining their normal erect configuration when the valve seal has been positioned over the ridges in the valve stem.

5. An internal combustion engine comprising a poppet valve and an elastomer seal, an opening in said seal for accommodating the valve stem, *and at least one* deformation[s] on said valve stem whereby said seal is secured to said stem by said deformation[s].

6. An internal combustion engine comprising a poppet valve and a valve seal, an opening in said valve seal for accommodating the valve stem, deformations on the valve stem, said seal resiliently engaging the deformations on the valve stem whereby said seal interlocks with said deformations.

7. An internal combustion engine comprising a poppet valve and an elastomer valve seal, unbendable deformations on the poppet valve stem, said elastomer seal being secured to said valve stem by the resilient conformation of the elastomer seal to said deformations.

8. An internal combustion engine comprising a poppet valve and an elastomer skirted valve stem seal, said valve having a stem portion and a plurality of deformations on said valve stem, said seal having an annular base and an opening in said base adapted to accommodate the valve stem deformations whereby the seal is secured to the valve stem by the plastic flow of the elastomer seal.

9. An internal combustion engine comprising a poppet valve and an elastomer valve seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve, and *at least one* deformation[s] on said valve stem, said seal engaging the deformation[s] on said valve stem and enhancing the friction between said seal and said valve stem.

10. An internal combustion engine comprising a poppet valve and an elastomer valve seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve, the frictional force between the valve stem and elastomer seal being greater than the axial force imparted to the elastomer seal by the acceleration of the valve, and deformations on said valve stem, said seal conforming to the deformations on the valve stem and enhancing the friction between said seal and said valve stem.

11. In a valve stem oil deflector means for overhead valves, in combination with a vertically movable valve stem and a relatively stationary guide therefore having an upper bearing boss portion, an inverted cup-like member of elastomeric material on said valve stem above said guide and having a transverse portion and a depending skirt portion, said transverse portion having sufficient thickness for relative rigidity and said valve stem passing snugly but slidably through said transverse portion, said transverse portion abutting said guide bearing boss in one position of the valve stem, said skirt portion at that time surrounding the boss portion but spaced from the guide, and *at least one* deformation[s] on said valve stem, said transverse portion engaging said deformation[s] and enhancing the snugness between said transverse portion and said valve stem.

12. The combination of an internal combustion engine having an overhead poppet valve, a valve guide in which the stem of said valve reciprocates, and an oil seal comprising an annulus of elastomeric material through which said valve stem extends, the central opening of said annulus being of such diameter and thickness that it resiliently but firmly adheres to said valve stem and reciprocates in synchrony therewith, said seal including an integral continuation of said annulus extending therefrom radially sufficient to deflect descending oil from the valve stem adjacent to said valve guide, and deformations on said valve stem whereby said annulus engages said deformations and enhances the resilient adherence between the annulus and the valve stem.

*13. In an internal combustion engine having a poppet valve and a valve seal, said valve having a stem portion, said seal having a resiliently deformable stem engaging portion, at least said stem portion having at least one deformation thereon, said seal being held against axial displacement relative to said valve stem portion by the resilient conformation of its stem engaging portion to said deformation.*

*14. In an internal combustion engine, a poppet valve and an elastomer skirted valve stem seal, said valve stem having a stem portion having at least one deformation thereon, said seal having a base and an opening therein adapted to accommodate the valve stem portion, said opening being smaller in its original dimensions than the valve stem portion, said seal being secured to the valve stem portion by plastic flow in conformity to said deformation.*

References Cited in the file of this patent or the original patent

UNITED STATES PATENTS 2,698,012 Smith et al. ---------- Dec. 28, 1954